(12) United States Patent
Kling et al.

(10) Patent No.: US 6,223,304 B1
(45) Date of Patent: Apr. 24, 2001

(54) SYNCHRONIZATION OF PROCESSORS IN A FAULT TOLERANT MULTI-PROCESSOR SYSTEM

(75) Inventors: Lars-Örjan Kling, Södertälje; Sten Edvard Johnsson, Farsta, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/100,145

(22) Filed: Jun. 18, 1998

(51) Int. Cl.[7] .................................................. G60F 11/00
(52) U.S. Cl. ................................................ 714/12; 714/10
(58) Field of Search ................................. 714/10, 11, 12, 714/13

(56) References Cited

U.S. PATENT DOCUMENTS

| | | | |
|---|---|---|---|
| 4,590,554 | * 5/1986 | Glazer | 714/13 |
| 4,757,442 | 7/1988 | Sakata | 364/200 |
| 5,155,678 | 10/1992 | Fukumoto et al. | 395/425 |
| 5,202,980 | 4/1993 | Morita et al. | 395/575 |
| 5,235,700 | 8/1993 | Alaiwan et al. | 395/575 |
| 5,295,258 | 3/1994 | Jewett et al. | 395/575 |
| 5,404,508 | * 4/1995 | Konrad | 707/202 |
| 5,555,371 | * 9/1996 | Duyanovich | 714/13 |
| 5,737,514 | 4/1998 | Stiffler | 395/182 |
| 5,828,821 | * 10/1998 | Hoshina | 714/15 |
| 5,968,185 | * 10/1999 | Bressoud | 714/10 |
| 6,023,772 | * 2/2000 | Fleming | 714/13 |

FOREIGN PATENT DOCUMENTS

| | | |
|---|---|---|
| 0 306 348 | 3/1989 | (EP) . |
| 0 414 379 | 2/1991 | (EP) . |
| 0 433 979 | 6/1991 | (EP) . |
| 0 626 647 A1 | 11/1994 | (EP) . |
| 101876 | 10/1998 | (EP) . |
| PCT/SE99/0110 | 11/1999 | (WO) . |

* cited by examiner

Primary Examiner—Robert Beausoleil
Assistant Examiner—Bryce P. Bonzo
(74) Attorney, Agent, or Firm—Jenkens & Gilchrist, P.C.

(57) ABSTRACT

A method and system are described for synchronizing a first processor unit with a second processor unit in a fault tolerant system comprising a plurality of processing units where all processing units are executing the same processes in synchronization. The invention is readily adapted to a system of loosely coupled processing units with a low bandwidth communication channel coupled between the processing units.

29 Claims, 3 Drawing Sheets

SYNCHRONIZATION OF PROCESSORS IN A FAULT TOLERANT MULTI-PROCESSOR SYSTEM

BACKGROUND OF THE INVENTION

1. Technical Field of the Invention

The present invention relates to general processing systems and, in particular, to a system and method for synchronizing processors in a fault tolerant multi-processor system.

2. Description of Related Art

Fault tolerant systems, such as, for example, fault tolerant computer systems, are used in real time systems which must be up and running 24 hours a day. These systems are normally implemented using two or more redundant processing units executing the same programs in synchronization. Special methods are used to keep the processing units in synchronization, to detect and localize faults, and to reintegrate replaced units. As special designed hardware often is required to accomplish these functions, fault tolerant systems are usually relatively complicated to design.

It would be advantageous if the design of fault tolerant systems could be simplified by using commercially available components, such as, for example, state of the art microprocessors and memory, not especially designed for fault tolerance, as often as possible. This would make the fault tolerant systems less expensive, easier to design and upgrade when faster compatible components become available.

One way to simplify the design of fault tolerant systems is to lessen the requirement for run-time synchronization between the processing units. This approach will simplify the interaction between the processing units and make it easier to use commercially available components in their design. However at the same time, it becomes more difficult to synchronize a processing unit that has been out of synchronization with other processing units, such as, for example, when a processing unit is replaced. The working processing unit has local memory where information on all executing programs is stored. This state related information includes data describing the state of each executing program (each executing program consisting of a number of executing processes), data variables used by each executing program, etc. The replaced processing unit has to get its local memory updated with this information from one of the working processing units before the replaced processing unit can be brought into parallel operation again.

A simple method to update a replaced processing unit's local memory is to temporarily stop the normal program execution in the working processing units, while copying all state related information from the working processing units to the replaced processing unit. However, this approach delays the normal program execution by an amount that is proportional to the amount of information that has to be updated, and the inverse of the available bandwidth of the communication channel between the processing units, which is used to copy that information. In most cases this would require a very high bandwidth communication channel in order not to cause a longer operational delay than can be accepted in a fault tolerant system.

Another method used to update a replaced processing unit is to keep executing the normal programs while a background process copies all state related information from the working processing units to the replaced processing unit. Any changes to state related information in the working processing units local memory made during the background copying process will be transferred to the replaced processing unit in real-time on a communication channel between the working processing units and the replaced processing unit. This approach requires the bandwidth of the communication channel between the processing units to meet the maximum frequency of the information changes in the executing programs, which again complicates the interaction between the processing units.

It is, therefore, one object of the present invention to provide a simplified, yet highly reliable design for a fault tolerant system. Another object of the present invention is to use commercially available components in the design of fault tolerant systems as often as possible. A further object of the present invention is to simplify the interaction between processing units in a fault tolerant system. Still another object is to provide an improved method of re-integrating replaced units into a fault tolerant system.

SUMMARY OF THE INVENTION

The present invention is directed to a system and method for synchronizing processors in a fault tolerant system, and more specifically, to a fault tolerant multi-processor system built of loosely coupled processor units with a low bandwidth communication link between the processor units.

The synchronization is accomplished by first, in a normal execution mode, copying a first part of state related information from a working processor to a processor out of synchronization, and then secondly, while normal execution is temporarily suspended, copying the remaining second part of state related information from the working processor unit to the processor out of synchronization.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–4 of the drawings, like numerals being used for like and corresponding parts of the various drawings.

Figure 1:
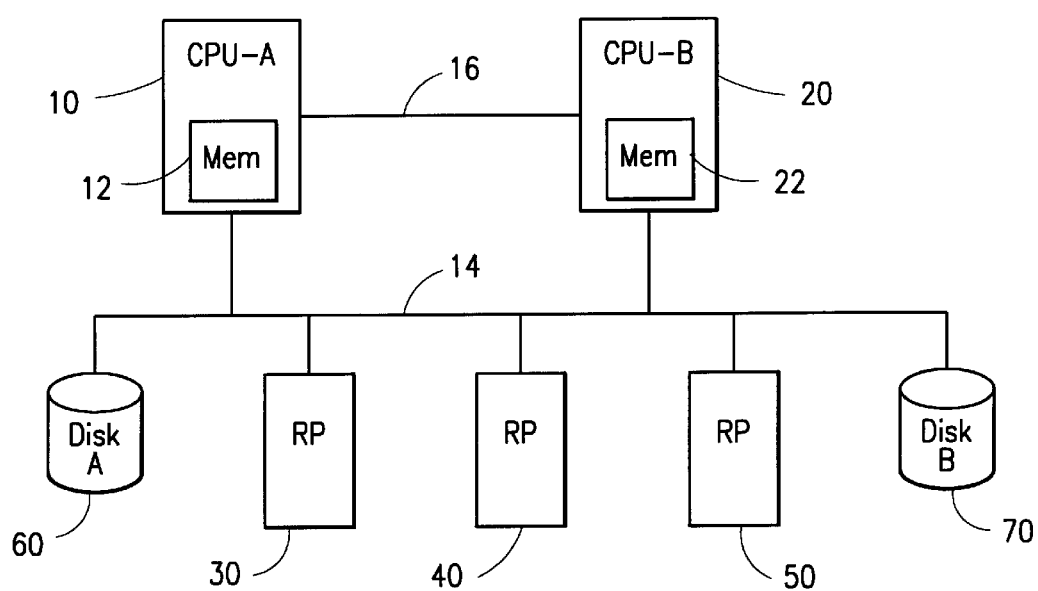
FIG. 1 shows a fault tolerant computer system with loosely-coupled processor units and a low bandwidth communication channel between the units, which can be used to implement the present invention.

FIG. 1 shows a fault tolerant computer system which can be used to implement the present invention. As such, this exemplary computer system should be seen only as an example of an environment where the present invention can be used. The fault tolerant computer system includes two loosely-coupled central processor units (CPUs) 10 and 20, shown as CPU-A and CPU-B. However, although two CPUs are shown, the present invention can be implemented with any appropriate number and type of processing units. Connected to the CPUs are a number of regional processors (RPs) 30, 40 and 50 that handle more specific tasks and are directed by the CPUs. The communication between the RPs and the CPUs is accomplished over the bus 14.

Synchronization between the two CPUs (10 and 20) is maintained during normal execution by certain synchronizing events, such as, for example, time stamping events, comparisons of counts of internal clock signals since the last synchronization, temporarily suspending the CPU ahead of the other, etc. As such, a number of conventional methods can be used to keep loosely-coupled processor units synchronized during normal program execution in a fault tolerant system.

Each CPU (10, 20) has it's own local memory 12 and 22 which contains all program and data needed during normal execution. The external memory disks 60 and 70 can be used by the CPUs to access information when the system is started up. The communication channel 16 is used for communication between the CPU's (10, 20), and in the present invention, this communication channel is used to transfer information during the synchronization process. A lower bandwidth on the communication channel will result in a longer synchronization process, but as a large part of the synchronization process in the present invention is accomplished in a normal operation mode, a communication channel with a high bandwidth is not required. This is a clear advantage compared to the prior art. The prior solutions required a high bandwidth, however the bandwidth of the communication channel is not intended as a limitation of the present invention.

In accordance with the present invention, the design of the fault tolerant computer system shown in FIG. 1 is relatively simple, because much of the conventional circuitry used to keep the CPUs in an exact synchronized state and the conventional high speed buses typically used for communication between the CPUs are not required.

When one of the CPUs (10, 20) loses synchronization with the other, such as, for example, when a CPU has been replaced, information stored in the replaced CPU's local memory (12, 22) will eventually be out of date. Some of the information may be loaded from a disk (60 or 70), but all state related information is copied from the working CPU. Essentially, in accordance with the present invention, different embodiments that can be used to accomplish this updating is shown in and described below with respect to FIGS. 2, 3 and 4.

Figure 2:
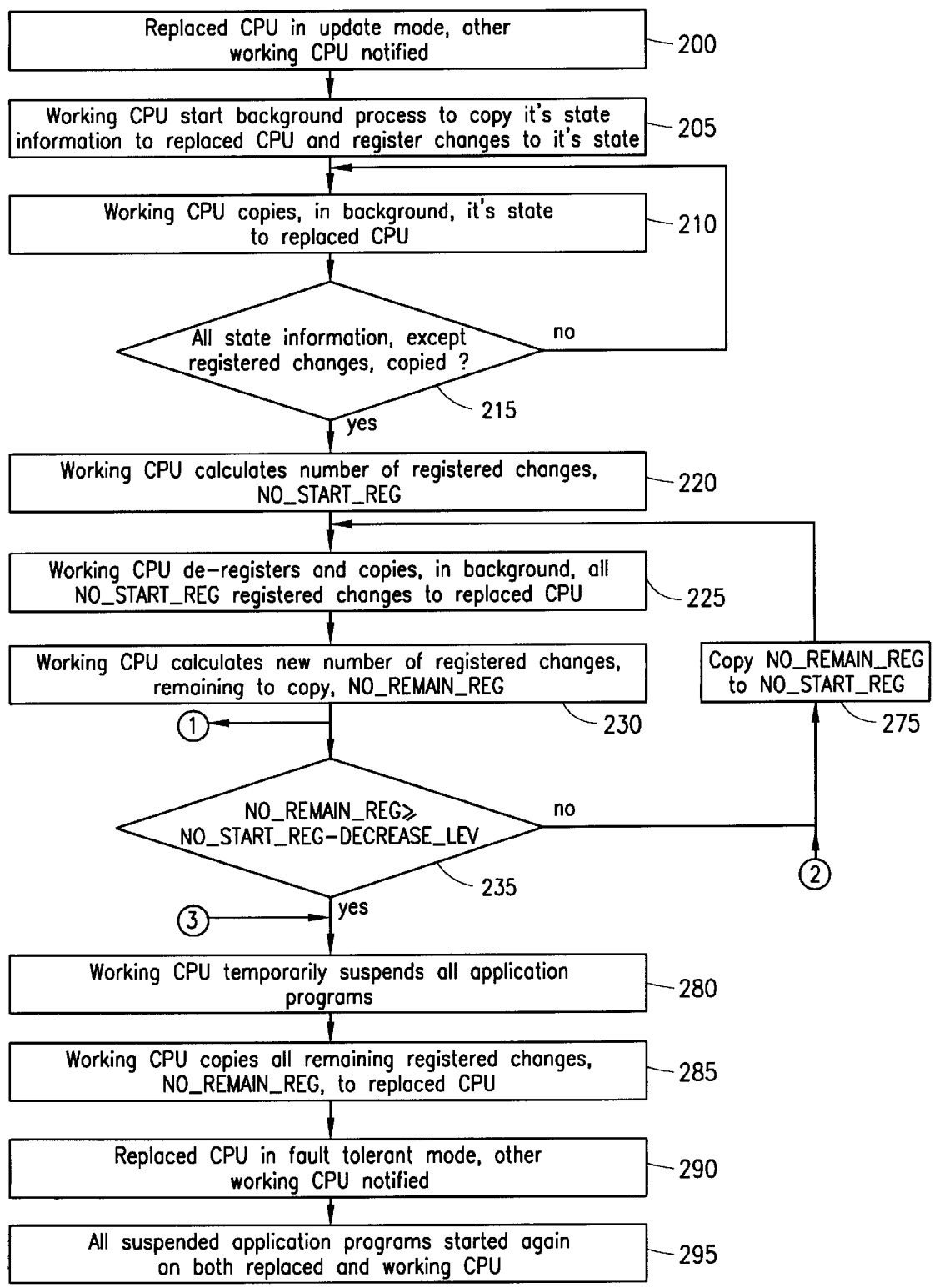
FIG. 2 is a flow diagram of a first embodiment of the present invention.

Referring to a first embodiment shown in FIG. 2, at step 200, a replaced CPU (e.g., 10 or 20) sets itself in an update mode and notifies the working CPU that the replaced CPU needs to be updated. This means that the replaced CPU is not part of the fault tolerant execution while it is being updated from the working CPU. At step 205, the working CPU starts preparing to transfer it's state related information over to the replaced CPU. As such, the working CPU initiates a background process (executed by software) to copy it's state related information over to the replaced CPU, and begins to continuously register all state related information changes made by the application programs, executing on the working CPU, during the background copying process to it's own local memory. At step 210, the background process copies state related information from the working CPU's local memory to the replaced CPU's local memory, by reading state related information in the working CPU's local memory and writing this state related information to the communication channel (16). The communication channel transfers the state related information to the replaced CPU, which retrieves the state related information and stores that information in it's own local memory. At step 215, step 210 is repeated until all state related information, except the registered state related information changes, has been copied to the replaced CPU. At step 220, the working CPU calculates the current number of registered state related information changes (hereinafter referred to as NO_START_REG). At step 225, the background process continues with copying all the NO_START_REG registered state related information changes from the working CPU to the replaced CPU, such that the state related information in the replaced CPU will be updated. When a registered state related information change is copied it is also removed, or de-registered, from the register of the state related information changes. During the time period all the NO_START_REG registered state related information changes are being copied, new state related information changes are registered. Consequently, at step 230, the working CPU calculates the number of current registered state related information changes remaining to be copied (hereinafter referred to as NO_REMAIN_REG). At step 235, the working CPU compares the number NO_REMAIN_REG with the number NO_START_REG minus a decrease level number (hereinafter referred to as DECREASE_LEV) to determine if the current number of registered state related information changes remaining to be copied, has decreased less than a predetermined level. If a minimum of remaining state related information changes is preferred for the last part of the synchronization process (e.g., minimizes system halt time) DECREASE_LEV is set to zero. If the system stop time is not critical, DECREASE_LEV can be given a low positive value to make the whole synchronization process shorter. When at step 235, the number NO_REMAIN_REG is less than the number NO_START_REG minus the number DECREASE_LEV, the working CPU copies, at step 275, the value in NO_REMAIN_REG over to NO_START_REG, whereupon steps 225 to 235 are repeated again.

Otherwise, when at step 235 the number NO_REMAIN_REG is greater than or equal to the number NO_START_REG minus the number DECREASE_LEV, the working CPU temporary suspends, at step 280, all application programs executing on the working CPU. At step 285 the working CPU copies all the remaining registered state related information changes to the replaced CPU. As all the application programs are suspended during step 285, there will not be any new state related information changes and consequently both CPUs are synchronized after step 285. At step 290, the replaced CPU sets itself in fault tolerant mode and notifies the working CPU of this action. At step 295, both CPUs resume operation in the fault tolerant mode, and all previously suspended application programs and processes are started again.

Figure 3:
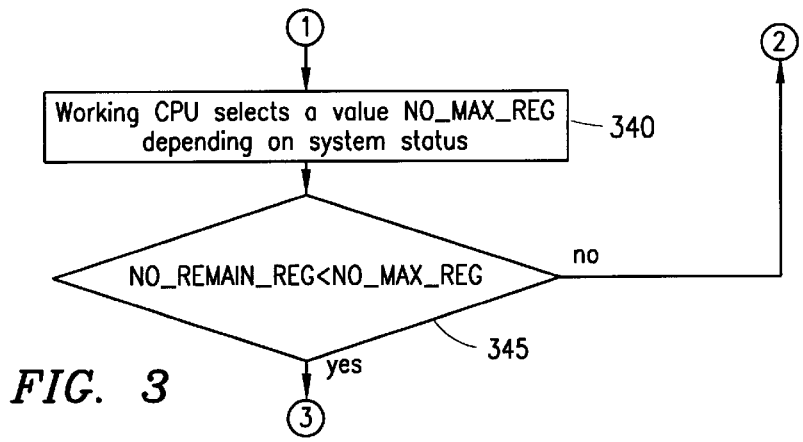
FIG. 3 is a flow diagram of a second embodiment of the present invention.

Referring to a second embodiment shown in FIG. 3, steps 300 to 330 are executed in the same way as steps 200 to 230 in FIG. 2. At step 340, the working CPU selects a number NO_MAX_REG. The number NO_MAX_REG represents the maximum number of state related information changes that currently can be copied during the last part of the synchronization process while all application programs temporarily are suspended, e.g. the maximum time the system currently can be halted. The number NO_MAX_REG is dependent on the system's status, that is the current working CPU's load (how much of the available time the CPU spends executing programs compared to being idle), and the effect a temporary halt currently would have on the system. The lower the CPU load, the higher NO_MAX_REG can be selected; the less critical a temporary halt is the higher NO_MAX_REG can be selected. At step 345, the working CPU compares the number NO_REMAIN_REG with the value NO_MAX_REG to determine if the number of registered state related information changes remaining to be copied is larger than the number currently allowed. When at step 345 the number NO_REMAIN_REG is larger than the number NO_MAX_REG, the working CPU copies, at step 375 (equivalent to step 275 in FIG. 2), the value in NO_REMAIN_REG over to NO_START_REG, whereupon steps 325 to 345 are repeated again.

Otherwise, when at step 345 the number NO_REMAIN_REG is less than or equal to the number NO_MAX_REG, the working CPU temporarily suspends, at step 380 (equivalent to step 280 in FIG. 2), all executing application programs. The remaining steps 385 to 395 are executed in the same way as steps 285 to 295 in FIG. 2.

Figure 4:
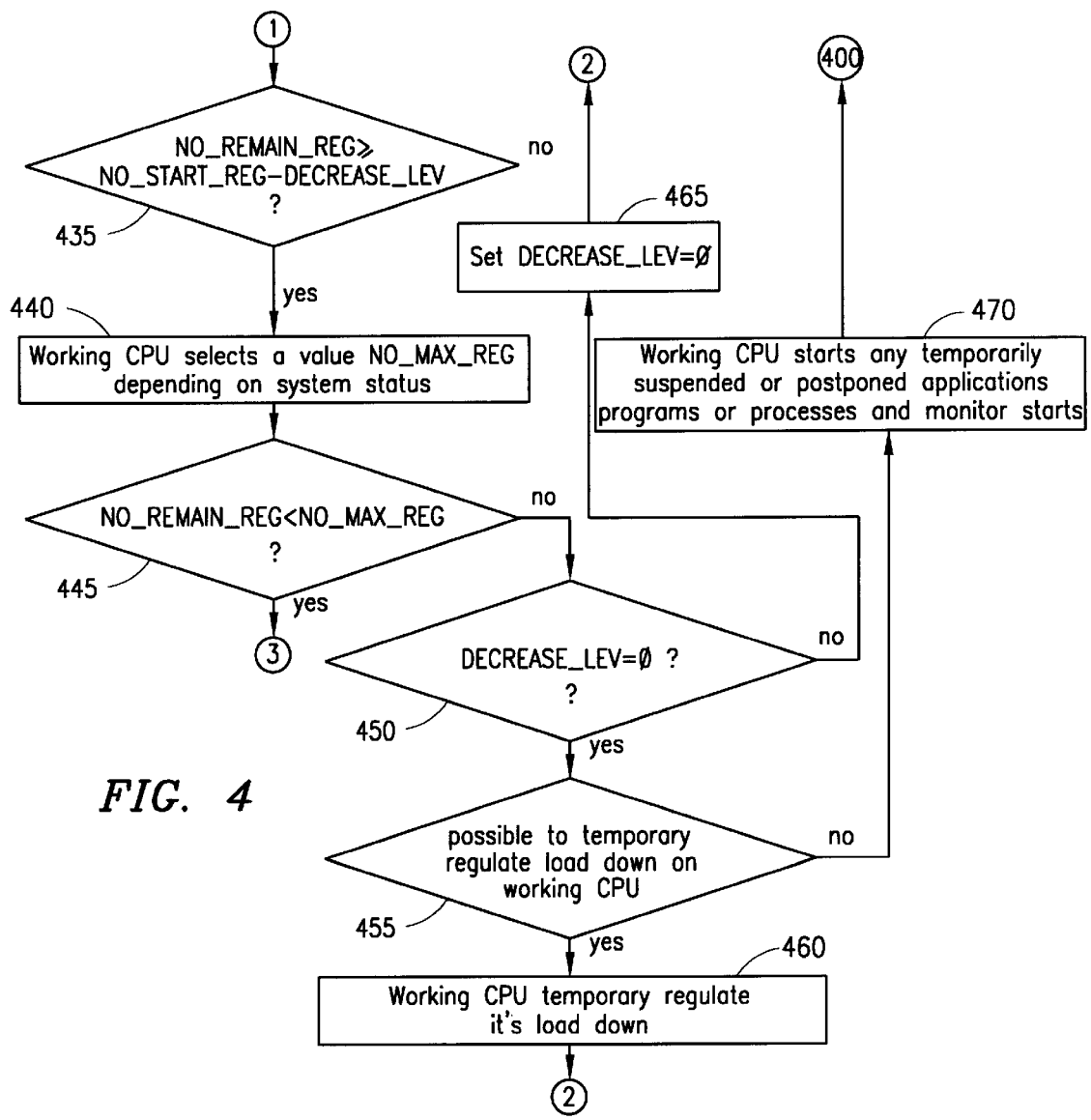
FIG. 4 is a flow diagram of a third embodiment of the present invention.

Referring to a third embodiment in FIG. 4, steps 400 to 435 are executed in the same way as steps 200 to 235 in FIG. 2, and steps 440 to 445 are executed in the same way as steps 340 to 345 in FIG. 3. However, when at step 445 the number NO_REMAIN_REG is larger than the number NO_MAX_REG, the working CPU checks at step 450 DECREASE_LEV to determine if it is equal to zero. If DECREASE_LEV is zero, the number of remaining registered changes is already at minimum and the working CPU checks at step 455 if the load on the working CPU temporarily can be regulated downward. Temporarily regulating the load downward on the working CPU can be done by, for example, temporarily suspending some of the low priority application programs or processes (e.g., part of programs) executing on the working CPU or temporarily postponing the start of some new, low priority, application programs or processes on the working CPU. A lower number of executing application programs or processes will result in a lower number of registered state related information changes when the background copying process is repeated. If, at step 455, the load on the working CPU temporarily can be regulated downward, it is regulated downward at step 460. The working CPU copies, at step 475 (equivalent to step 275 in FIG. 2), the value in NO_REMAIN_REG over to NO_START_REG whereupon steps 425 to 445 are repeated again.

Otherwise, when at step 450 the number DECREASE_LEV is greater than zero, the working CPU sets, at step 465, DECREASE_LEV to zero. Setting DECREASE_LEV to zero minimizes the number of registered state related information changes when the background copying process is repeated and, possibly, there will be no need to regulate the load on the working CPU. At the next step, 475 (equivalent to step 275 in FIG. 2), the working CPU copies the value in NO_REMAIN_REG over to NO_START_REG whereupon steps 425 to 445 are repeated again.

Otherwise, when at step 455, the load on the working CPU can not be regulated downward the working CPU starts, at step 470, any earlier suspended or postponed application programs or processes, notifies the replaced CPU that the update mode has been temporarily suspended, and starts monitoring the system status to select a time when the synchronization process can be started again. When the system status allows, that is, the working CPU load is below a certain threshold and system stop time is less critical, the synchronization is started again by the working CPU notifying the replaced CPU, and the synchronization process is started again from step 400.

Otherwise, when at step 445, the number NO_REMAIN_REG is less than or equal to the number NO_MAX_REG, the working CPU temporarily suspends, at step 480 (equivalent to step 280 in FIG. 2), all executing application programs. The remaining steps 485 to 495 are executed in the same way as steps 285 to 295 in FIG. 2.

The registering of state related information changes that the working CPU accomplishes while the background process copies state related information changes from the working CPU to the replaced CPU can, for example, be implemented with queues or hash tables, or a combination of both hash tables and queues. A portion of the working processor's local memory, not used for other purposes, is preferably set aside for this. The preferred implementation depends to an extent on the kind of support the operating system has for registering information changes.

An important technical advantage of the present invention is that the design of fault tolerant systems is simplified. Another technical advantage of the present invention is that the suspend time (i.e., the time the running applications need to be stopped for the synchronization to take place) is minimized. Yet another technical advantage of the present invention is that the required bandwidth for the communication channels between the processor units is minimized.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for synchronizing a first processor unit with a second processor unit, comprising the steps of:
   a) copying second processor related state information from said second processor unit to said first processor unit during a normal ongoing operation mode of the second processor;
   b) registering changes which occur in said second processor related state information during the execution of copying step a);
   c) copying a plurality of said step b) registered changes in said second processor related state information from said second processor unit to said first processor unit during a continuation of the normal ongoing operation mode of the second processor;
   d) registering changes which occur in said second processor related state information during the execution of copying step c) to identify a number of remaining registered changes in said second processor related state information; and
   e) temporarily suspending said normal operation mode while copying said number of remaining registered changes in said second processor related state information from said second processor unit to said first processor unit.

2. The method according to claim 1, further comprising the step of repeating the operation of steps c) and d) until the number of remaining registered changes in said second processor related state information is below a selected number before performing step e).

3. The method according to claim 1, further comprising the step of repeating the operation of steps c) and d) until the number of remaining registered changes in said second processor related state information decreases less than a selected number before performing step e).

4. The method according to claim 1, further comprising the step of repeating the operation of steps c) and d) until the number of remaining registered changes in said second processor related state information no longer decreases before performing step e).

5. The method according to claim 1, further comprising the step of repeating the operation of steps c) and d) until the number of remaining registered changes in said second processor related state information both decreases less than a selected number and is below a selected maximum value before performing step e).

6. The method according to claim 1, further comprising the steps of:
   repeating steps c) and d) until the number of remaining registered changes in said second processor related state information decreases less than a selected number;
   determining that said number of remaining registered changes in said second processor related state information is above a selected maximum value; and
   again repeating steps c) and d) until the number of remaining registered changes in said second processor related state information is below the selected maximum value before performing step e).

7. The method according to claim 6, further including the step of
   determining that a load on said second processor unit can be regulated downward.

8. The method according to claim 7, further comprising the step of:
   regulating said load downward on said second processor unit before performing step e).

9. The method according to claim 1, further comprising the steps of:
   repeating steps c) and d) until a number of remaining registered changes in said second processor related state information decreases less than a selected number;
   determining that said number of remaining registered changes in said second processor related state information is above a selected maximum value, and that said selected number is greater than zero; and
   repeating steps c) and d) until said number of remaining registered changes in said second processor related state information both no longer decreases and is below a selected maximum value before performing step e).

10. The method according to claim 1, further comprising the steps of:
    repeating steps c) and d) until the number of remaining registered changes in said second processor related state information decreases less than a selected number, and that said number of remaining registered changes in said second processor related state information is above a selected maximum value, and that said selected number is zero,
    determining that a load on said second processor unit can not be regulated downward, and
    monitoring a system status value.

11. The method according to claim 10, further comprising the step of:
    determining that said system status value is below a selected value before performing step e).

12. The method according to claim 1, further including the steps of:
    repeating steps c) and d) until the number of remaining registered changes in said second processor related state information no longer decreases, and that said number of remaining registered changes in said second processor related state information is above a selected maximum value, and
    suspending at least one program before performing step e).

13. The method according to claim 1, further comprising the steps of:
    repeating the operation of steps b) and c); and
    temporarily suspending said normal ongoing operation mode while copying said number of remaining registered changes in said second processor related state information from said second processor unit to said first processor unit.

14. A fault tolerant system comprising: a plurality of processor units; at least one of said processor units including
    a) means for copying information from a second processor unit to a first processor unit;
    b) means for registering changes in said information in said second processor unit during a normal operation mode;
    c) means for de-registering registered changes in said information when said registered changes in said information has been copied by said means for copying;
    d) means for counting said registered changes in said information during said normal operation mode;
    e) means for comparing a first value, representing a first number of said registered changes, with a second value, representing a sum of a second number of said registered changes, and a selected value, during said normal operation mode; and
    f) means for selectively, dependent on the result of the comparison in said means for comparing step, temporarily suspending said normal operation mode.

15. The system according to claim 14, further comprising means for regulating a load on said second processor unit.

16. The system according to claim 15, wherein said regulating means temporarily suspends a portion of lower priority programs from said normal operation mode on said second processor unit.

17. The system according to claim 14, wherein said second number corresponds to the number of new registered changes during the period said first number of said registered changes are copied.

18. The system according to claim 17, further comprising means for evaluating status of said fault tolerant system.

19. The system according to claim 18, wherein said means for evaluating status measures a load value on said second processor unit during said normal operation mode.

20. The system according to claim 18, wherein said means for evaluating status calculates a maximum time said normal operation mode currently can be temporarily suspended.

21. The system according to claim 20, further comprising means for calculating a maximum number of said registered changes that can be copied during said maximum time.

22. A fault tolerant system operating method wherein the system comprises a plurality of processor units, and at least one of said processor units operating to perform the following steps:
    a) copying information from a second processor unit to a first processor unit;
    b) registering changes in said information in said second processor unit during a normal operation mode;
    c) de-registering registered changes in said information when said registered changes in said information has been copied by said means for copying;
    d) counting said registered changes in said information during said normal operation mode;
    e) comparing a first value, representing a first number of said registered changes, with a second value, representing a sum of a second number of said registered changes, and a selected value, during said normal operation mode; and
    f) selectively, dependent on the result of the comparison in said means for comparing step, temporarily suspending said normal operation mode.

23. The method according to claim 22, further comprising the step of regulating a load on said second processor unit.

24. The method according to claim 23, wherein said step of regulating comprises the step of temporarily suspending a portion of lower priority programs from said normal operation mode on said second processor unit.

25. The method according to claim 22, wherein said second number corresponds to the number of new registered changes during the period said first number of said registered changes are copied.

26. The method according to claim 25, further comprising the step of evaluating status of said fault tolerant system.

27. The method according to claim 26, wherein said step of evaluating status comprises the step of measuring a load value on said second processor unit during said normal operation mode.

28. The method according to claim 26, wherein said step of evaluating status comprises the step of calculating a maximum time said normal operation mode currently can be temporarily suspended.

29. The method according to claim 28, further comprising the step of calculating a maximum number of said registered changes that can be copied during said maximum time.

* * * * *